INVENTOR.
R. G. LeTourneau

Jan. 19, 1943.  R. G. LE TOURNEAU  2,308,613
BALL AND SOCKET UNIT
Filed June 20, 1941  2 Sheets-Sheet 2
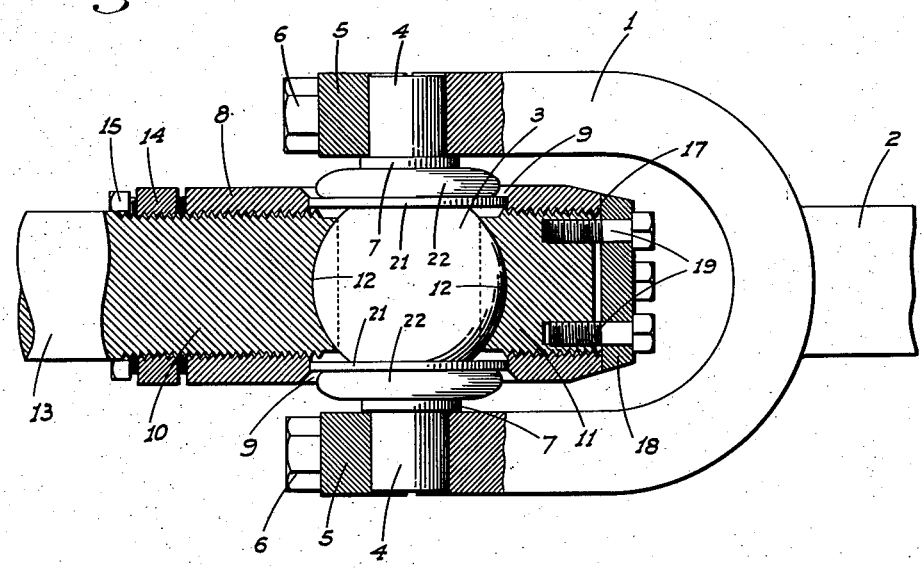
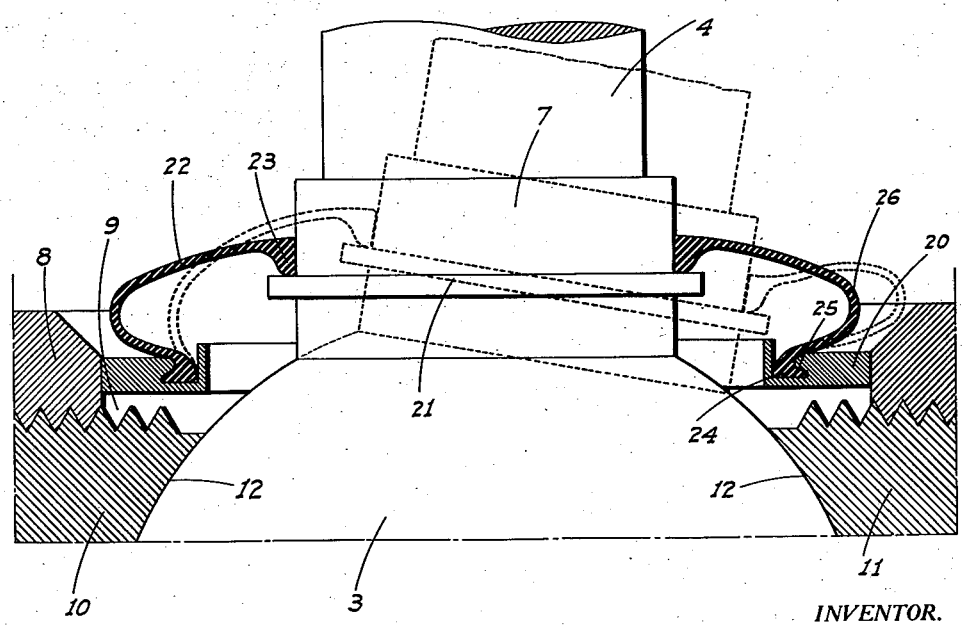
INVENTOR.
R. G. LeTourneau
BY
ATTORNEYS Patented Jan. 19, 1943

2,308,613

UNITED STATES PATENT OFFICE 2,308,613

BALL AND SOCKET UNIT

Robert G. Letourneau, Peoria, Ill., assignor to R. G. Letourneau, Inc., a corporation of California Application June 20, 1941, Serial No. 398,966

8 Claims. (Cl. 287—88)

This invention is directed generally to a ball and socket unit, and relates particularly to a ball and socket unit adapted for use as a universal type draft connection between a vehicle, such as a tractor, and a trailer, such as an earth working and carrying scraper.

One of the objects is to provide a ball and socket unit having long life under strenuous working conditions; the unit being designed to prevent undue wear and to assure against accidental breakage of parts.

Another object of the invention is to embody unique adjusting means in the unit whereby the ball may be maintained in proper frictional contact in the socket and within close limits; such adjusting means being arranged with releasable locking means.

A further object of the invention is to provide the ball and socket unit with a unique dust seal which is effective to prevent dust from gaining access to the working surfaces of the ball and socket, thus enabling the unit to be successfully used in connection with earth working equipment.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 3 is a side elevation, mainly in section.

Figure 4 is an enlarged fragmentary sectional elevation showing one of the dust seals in detail.

Figure 1:
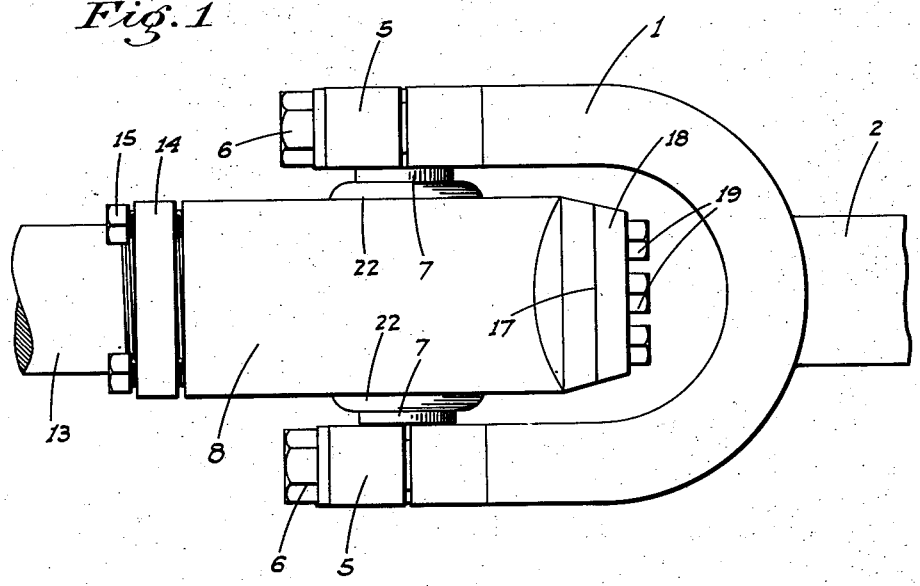
Figure 1 is a side elevation of the unit.
Figure 2:
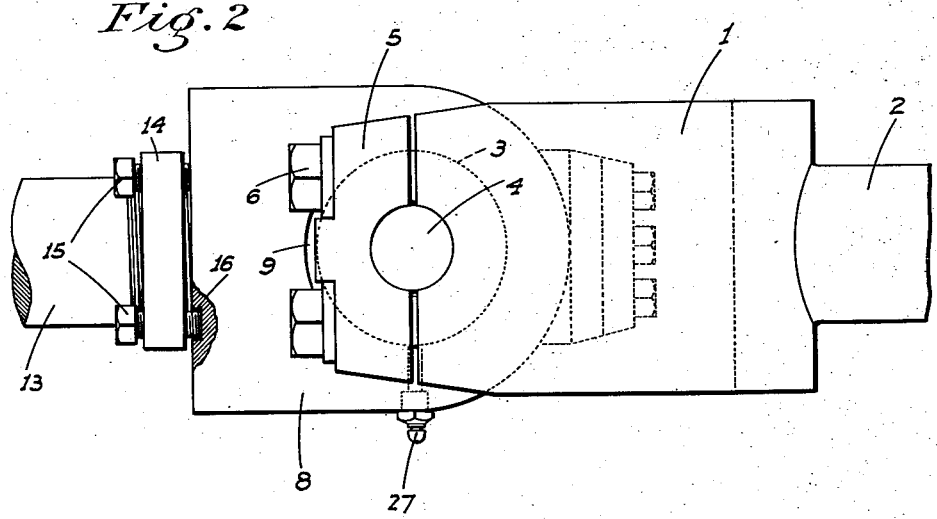
Figure 2 is a plan view.

Referring now more particularly to the characters of reference on the drawings, the unit comprises a yoke 1 having its arms vertically spaced and with its open end facing horizontally; there being a draft member 2 formed rigid with and projecting horizontally and outward from the closed end of said yoke.

A ball 3 is disposed centrally between and spaced from the outer end portions of the arms of yoke 1, and integral trunnions 4 project from the ball in opposite directions and toward the yoke arms. These trunnions are clamped in connection with the outer end portions of the yoke arms by means of holding caps 5 and cap screws 6. Between the yoke arms and the ball the trunnions are enlarged in diameter as at 7.

The socket assembly which cooperates with ball 3 comprises a one-piece body or block 8 of substantial thickness, and having flat upper and lower faces; the thickness or height of such body being substantially the same as the diameter of ball 3, while its width is considerably greater. Intermediate its ends the body is formed with a vertical opening 9 therethrough and of sufficient size to receive the ball in clearance relation.

The body 8 is bored and tapped from opposite ends in axial alinement and centrally into the vertical opening 9; the diameter of the bores being less than that of the ball 3. Adjusting plugs 10 and 11 are threaded into said bores, and at their adjacent or inner ends the plugs are formed with ball seats or sockets 12 which cooperatively engage ball 3. The plug 10 extends or continues outwardly from body 8 as a draft member 13; a collar 14 being threaded on this plug adjacent but beyond the body, and cap screws 15 are threaded through the collar parallel to the axis thereof and seat in sockets 16 in the end of the body. It will be seen that with the cap screws 15 set up tightly the plug 10 is firmly locked against rotation due to binding of the plug threads.

The other plug 11 terminates at its outer end within the corresponding bore and the body about the outer end of said bore is finished to form a flat annular seat 17 against which a disc 18 rests. Cap screws 19 extend through this disc into the adjacent end of plug 11. When these caps screws are tightened, the plug threads bind and plug 11 is locked against rotation, while rotation of the plug when desired is effected by exerting a turning pressure on the disc when the screws are loosened.

As both plugs 10 and 11 are adjustable relative to the body, a nicety of fit with ball 3 may be maintained, and the locking means assures against accidental unthreading of said plugs.

The dust seal assembly for the ball and socket unit comprises at each end of opening 9, a flat ring 20 press fitted into said opening and having substantial clearance relative to the ball 3 and corresponding trunnion portion 7. An annular flange 21 projects from said corresponding trunnion portion 7 in a plane outwardly of ring 20. A boot 22 of annular configuration, and of flexible and resilient material such as rubber, extends between the trunnion portion 7 and ring 20; said boot being formed with a bead 23 which closely engages about said trunnion portion 7 and also engages the outer side of flange 21. The boot is also formed with a holding bead 24 which engages in a correspondingly shaped, outwardly opening and annular groove 25 in the ring 20, said groove being enlarged radially outward from top to bottom and the bead 24 being correspondingly formed. The boot intermediate beads 23 and 24 is of a diameter considerably enlarged relative to bead 24, as at 26, whereby to permit of relative movement of the trunnion and ring without tendency to stretch and unseat the boot.

Grease is supplied to the ball and socket by means of a fitting 27 threaded into the body 8 between the plugs and connecting with a passage leading to the working surfaces.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a ball and socket unit, a socket assembly including a body having an opening in which the ball is disposed, said body being bored and tapped from one end to said opening, a ball seat plug threaded into said bore to engage the ball, said plug projecting out of the bore and beyond said end of the body, a collar threaded on the projecting portion of the plug adjacent said end of the body, and manually actuated means to apply a separating force to the collar and body whereby to bind the plug threads and prevent unscrewing of said plug.

2. In a ball and socket unit, a socket assembly including a body having an opening in which the ball is disposed, said body being bored and tapped from one end to said opening, a ball seat plug threaded into said bore to engage the ball, said plug projecting out of the bore and beyond said end of the body, a collar threaded on the projecting portion of the plug, and a cap screw threaded through said collar parallel to the plug axis and forcefully but releasably engaging said end of the body whereby to bind the plug threads and prevent unscrewing of said plug.

3. In a ball and socket unit, a socket assembly including a body having an opening in which the ball is disposed, said body being bored and tapped from one end to said opening, a ball seat plug threaded into said bore to engage the ball, said plug projecting out of the bore and beyond said end of the body, a collar threaded on the projecting portion of the plug, and circumferentially spaced cap screws threaded through said collar parallel to the plug axis, said end of the body having corresponding sockets in which said screws forcefully but releasably seat whereby to bind the plug threads and prevent unscrewing of said plug.

4. In a ball and socket unit, a socket assembly including a body having an opening in which the ball is disposed, said body being bored and tapped from one end to said opening, a ball seat plug threaded into said bore to engage the ball, said plug terminating at its outer end short of the outer end of said bore in the body, a plate member overlying said end of the bore and engaging said one end of the body, and a cap screw extending through said plate and threaded into the adjacent end of the plug whereby when the screw is tight to bind the plug threads and prevent unscrewing of said plug.

5. In a ball and socket unit, a socket assembly including a body having an opening in which the ball is disposed, said body being bored and tapped from one end to said opening, a ball seat plug threaded into said bore to engage the ball, said plug projecting out of the bore and therebeyond as one of the draft members of the unit, and means releasably locking said plug in the body to prevent unscrewing of said plug.

6. In a ball and socket unit, a socket assembly including a body having a socket opening in which the ball is disposed, a trunnion on the ball projecting out of one end of said opening, a ring surrounding said trunnion in spaced relation and fitted into said one end of the opening in the body, and a flexible boot of annular configuration engaging said trunnion and the ring and extending therebetween in sealing relation.

7. A device as in claim 6 in which the boot includes one bead frictionally engaging about the trunnion; the ring being annularly grooved in its outer face and the boot having another bead seated in said groove.

8. In a ball and socket unit, a socket assembly including a body having a socket opening in which the ball is disposed, a trunnion on the ball projecting out of one end of said opening, means on the body having an outwardly opening annular groove about said trunnion, and a flexible boot of annular configuration extending about said trunnion; said boot having one bead frictionally engaging the trunnion and another bead seated in said groove, said one bead being disposed in a plane axially outwardly relative to said other bead, and a retaining flange on the trunnion projecting radially therefrom immediately inwardly of said one bead.

ROBERT G. LETOURNEAU.